United States Patent
Peng et al.

(10) Patent No.: US 11,496,717 B2
(45) Date of Patent: Nov. 8, 2022

(54) PROJECTION SYSTEM AND PROJECTION METHOD FOR PERFORMING PROJECTION POSITIONING FUNCTION

(71) Applicant: Coretronic Corporation, Hsin-Chu (TW)

(72) Inventors: Chien-Chun Peng, Hsin-Chu (TW); Hsun-Cheng Tu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 20 days.

(21) Appl. No.: 16/726,932

(22) Filed: Dec. 26, 2019

(65) Prior Publication Data
US 2020/0213565 A1    Jul. 2, 2020

(30) Foreign Application Priority Data
Dec. 28, 2018   (CN) .......................... 201811621930.3

(51) Int. Cl.
*H04N 9/31*       (2006.01)
*G03B 21/20*      (2006.01)

(52) U.S. Cl.
CPC ........... *H04N 9/31* (2013.01); *G03B 21/2046* (2013.01); *H04N 9/3147* (2013.01);
(Continued)

(58) Field of Classification Search
CPC .... G03B 21/2046; H04N 9/31; H04N 9/3141; H04N 9/3147; H04N 9/3185; H04N 9/3194
See application file for complete search history.

(56) References Cited

U.S. PATENT DOCUMENTS

| | | | |
|---|---|---|---|
| 6,719,433 B1 * | 4/2004 | Belliveau ............. | H04N 9/3194 348/E13.058 |
| 2010/0277655 A1 * | 11/2010 | Sun ......................... | H04N 9/12 348/744 |

(Continued)

FOREIGN PATENT DOCUMENTS

| | | |
|---|---|---|
| CN | 101430207 | 5/2009 |
| CN | 102170546 | 8/2011 |

(Continued)

OTHER PUBLICATIONS

"Office Action of China Counterpart Application", dated Jun. 10, 2021, p. 1-p. 13.

*Primary Examiner* — Magda Cruz
(74) *Attorney, Agent, or Firm* — JCIPRNET (57) ABSTRACT

A projection system and a projection method are provided. The projection system includes a processing module, a projection module and a photographing module. The projection module projects a first projection image based on a projection scope. The photographing module captures a part of the first projection image based on a photographing scope, so as to obtain a first photographic image. The part of the first projection image includes a plurality of first positioning grid points. The processing module analyzes the first photographic image, so as to obtain a plurality of first grid point coordinates. The processing module calculates a plurality of preset grid point coordinates corresponding to a plurality of preset positioning grid points in the whole projection scope one by one according to the first grid point coordinates. The processing module determines a projection result in the projection scope according to the preset grid point coordinates.

24 Claims, 5 Drawing Sheets

(52) U.S. Cl.
CPC ......... *H04N 9/3185* (2013.01); *H04N 9/3141* (2013.01); *H04N 9/3194* (2013.01)

(56) References Cited

U.S. PATENT DOCUMENTS

| | | | | |
|---|---|---|---|---|
| 2011/0210987 | A1* | 9/2011 | Furui | H04N 9/3185 345/682 |
| 2012/0206696 | A1* | 8/2012 | Haraguchi | G03B 21/147 353/69 |
| 2013/0027599 | A1* | 1/2013 | Hung | H04N 9/3194 348/333.1 |
| 2013/0057707 | A1* | 3/2013 | Hasegawa | G06T 7/136 348/189 |
| 2015/0077573 | A1* | 3/2015 | Ishikawa | G03B 21/147 348/189 |
| 2015/0077596 | A1* | 3/2015 | Ryu | G06T 5/006 348/241 |
| 2015/0213584 | A1* | 7/2015 | Ishikawa | H04N 9/3147 345/637 |
| 2015/0262550 | A1* | 9/2015 | Kawaguchi | G09G 5/06 345/601 |
| 2015/0304617 | A1* | 10/2015 | Chang | H04N 13/254 348/189 |
| 2016/0173840 | A1* | 6/2016 | Kurakake | G06F 3/0425 348/745 |
| 2017/0280120 | A1* | 9/2017 | Lai | H04N 9/3194 |
| 2018/0061021 | A1* | 3/2018 | Lin | G06T 7/80 |
| 2019/0104290 | A1* | 4/2019 | Lin | G06T 7/97 |
| 2019/0149786 | A1* | 5/2019 | Peng | H04N 9/3188 348/136 |
| 2019/0149787 | A1* | 5/2019 | Peng | G06T 7/74 348/135 |

FOREIGN PATENT DOCUMENTS

| | | | |
|---|---|---|---|
| CN | 105376540 | | 3/2016 |
| EP | 1395050 | | 3/2004 |
| JP | H09159990 | | 6/1997 |
| JP | 2012237604 A | * | 12/2012 ............ G01B 11/00 |
| TW | 200825876 | | 6/2008 |
| TW | 201808000 | | 3/2018 |

* cited by examiner

PROJECTION SYSTEM AND PROJECTION METHOD FOR PERFORMING PROJECTION POSITIONING FUNCTION

CROSS-REFERENCE TO RELATED APPLICATION

This application claims the priority benefit of China application serial no. 201811621930.3, filed on Dec. 28, 2018. The entirety of the above-mentioned patent application is hereby incorporated by reference herein and made a part of this specification.

BACKGROUND OF THE INVENTION

1. Field of the Invention

The present invention relates to a display technology, and in particular, to a projection system and a projection method.

2. Description of Related Art

Along with increase of projection requirements, how to design a projector to provide a good projection effect by being adapted to various projection environments is one of current important research and development directions in the field of projectors. For example, when a projector is applied to perform projection operation on a non-planar projection surface or a projection surface with non-fixed curvature change, a user needs to manually perform multiple times of operation of projection parameter adjustment on the projector, so as to complete projection positioning. Furthermore, in a certain application situation, if a plurality of projectors need to be integrated into one projection system to provide a large-area projection effect, a user needs to manually adjust the projectors one by one, resulting in increase of projection system erection time and cost. Therefore, as for how to enable a single projector or the projection system integrated by the plurality of projectors to effectively perform projection positioning to accurately project a projection image on the projection surface, solutions of several embodiments will be provided below.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The present invention provides a projection system and a projection method, which are capable of effectively performing a projection positioning function and providing a good projection effect.

Other objectives and advantages of the present invention may be further known from technical features disclosed by the present invention.

In order to achieve one, some, or all of the aforementioned objectives or other objectives, one embodiment of the present invention provides a projection system, including a processing module, a projection module and a photographing module. The projection module is coupled to the processing module. The projection module is used for projecting a first projection image based on a projection scope. The first projection image includes a plurality of first positioning grid points. The photographing module is coupled to the processing module. The photographing module is used for capturing a part of the first projection image based on a photographing scope, so as to obtain a first photographic image. The part of the first projection image includes the plurality of first positioning grid points. The area of an overlapped part of the photographing scope and the projection scope is smaller than the projection scope. The processing module analyzes the plurality of positioning grid points of the first photographic image, so as to obtain a plurality of first grid point coordinates. The processing module calculates a plurality of preset grid point coordinates corresponding to a plurality of preset positioning grid points in the whole projection scope one by one according to the plurality of first grid point coordinates. The processing module determines a projection result of the projection module in the projection scope according to the plurality of preset grid point coordinates.

In order to achieve one, some, or all of the aforementioned objectives or other objectives, one embodiment of the present invention provides a projection method, including the following steps: projecting a first projection image based on a projection scope, wherein the first projection image includes a plurality of first positioning grid points; capturing a part of the first projection image based on a photographing scope, so as to obtain a first photographic image, wherein the first projection image includes the plurality of first positioning grid points, and the area of an overlapped part of the photographing scope and the projection scope is smaller than the projection scope; analyzing the plurality of first positioning grid points of the first photographic image, so as to obtain a plurality of first grid point coordinates; calculating a plurality of preset grid point coordinates corresponding to a plurality of preset positioning grid points in the whole projection scope one by one according to the plurality of first grid point coordinates; and determining a projection result in the projection scope according to the plurality of preset grid point coordinates.

Based on the foregoing, the embodiment of the present invention at least has one of the following advantages or effects. The projection system and the projection method disclosed by the present invention may effectively save data computation amount needed by projection positioning by means of local image acquisition, and can provide a good projection effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
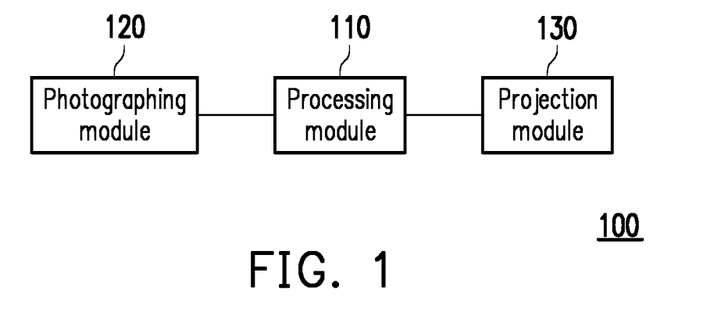
FIG. 1 is a functional block diagram of a projection system according to one embodiment of the present invention.

FIG. 1 is a functional block diagram of a projection system according to one embodiment of the present invention. Referring to FIG. 1, the projection system 100 includes a processing module 110, a photographing module 120 and a projection module 130. The processing module 110 is coupled to the photographing module 120 and the projection module 130. In the present embodiment, the projection module 130 is used for projecting an image to a projection surface, and the photographing module 120 is used for capturing the image projected by the projection module 130. The image projected by the projection module 130 may include a plurality of positioning grid points. Furthermore, the processing module 110 may perform projection positioning by analyzing a distance relation among the plurality of positioning grid points in a photographic image provided by the photographing module 120.

In the present embodiment, the processing module 110 may include a central processing unit (CPU) with an image data analyzing and processing function, or other programmable microprocessors, image processing units (IPU), graphics processing units (GPU), digital signal processors (DSP), application-specific integrated circuits (ASIC), and programmable logical devices (PLD) with general purposes or special purposes, other similar operational circuits or a combination of the circuits. Furthermore, the processing module 110 may be further coupled to a memory, so that related image data, image analysis software and image processing software needed for realization of the projection system and the projection method of the present invention are stored in the memory, to be read and executed by the processing module 110.

In the present embodiment, the photographing module 120 may be a camera. The photographing module 120 and the projection module 130 may be provided in same projector equipment, or may be provided by being independent from each other, which is not limited in the present invention. In the present embodiment, the projection module 130 may be a projector, and may further include a light source module (for example a light emitting device with a discharge bulb, a light emitting diode or a laser light source), and an optical machine (with an optical modulator, for example, a reflection-type or transmission-type spatial light modulator, with the reflection-type spatial optical modulator as an example, a reflection-type liquid crystal on silicon (LCOS) or a digital micro-mirror device (DMD) and the like; the transmission-type spatial light modulator, for example, a transparent liquid crystal panel). In addition, according to different input manners of a control signal, the optical modulator, for example, is an optically addressed spatial light modulator (OASLM) or an electrically addressed spatial light modulator (EASLM), a projection lens set (including a plurality of lenses) and an image output unit (for example, outlet interface (I/O port or interface) of an output signal); video signals or control signals are transmitted by Bluetooth, Wi-Fi, Zigbee or other wireless manners, may be also transmitted by adopting optical fiber or other wired transmission interfaces), and the like, and other suchlike related circuit elements.

Figure 2:
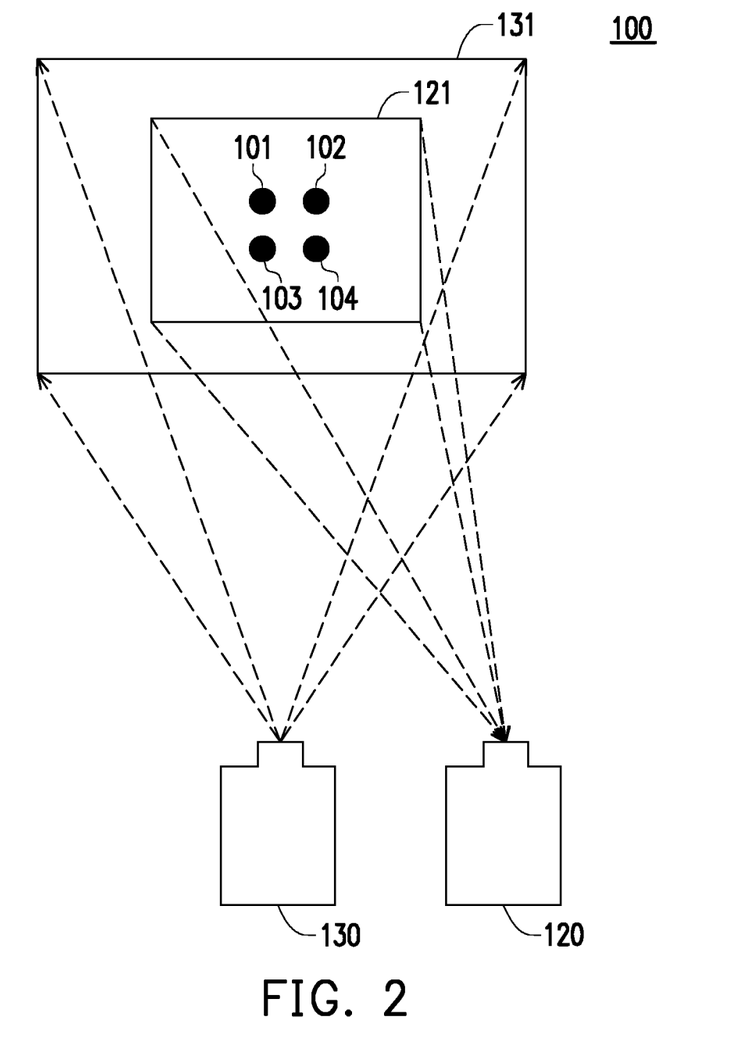
FIG. 2 is a situation schematic diagram of projection of a first projection image according to the embodiment of FIG. 1.
Figure 3:
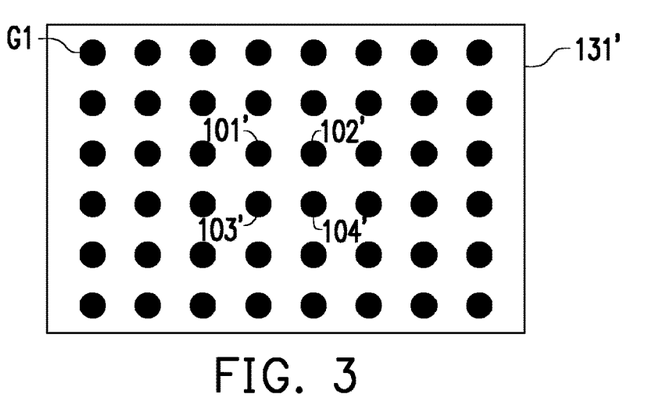
FIG. 3 is a situation schematic diagram of a plurality of preset positioning grid points according to the embodiment of FIG. 1.

FIG. 2 is a situation schematic diagram of projection of a first projection image according to the embodiment of FIG. 1. FIG. 3 is a situation schematic diagram of a plurality of preset positioning grid points according to the embodiment of FIG. 1. Referring to FIG. 1 to FIG. 3, the projection module 130 projects a first projection image based on a projection scope 131. The first projection image includes a plurality of first positioning grid points 101 to 104. The plurality of first positioning grid points 101 to 104 may be four grid points arranged in an array form, but the present invention is not limited to this. In one embodiment, the arrangement form and the quantity of the plurality of first positioning grid points 101 to 104 may be correspondingly designed according to different projection positioning requirements. Then the photographing module 120 captures a part of the first projection image based on a photographing scope 121, so as to obtain a photographic image. However, the photographing scope of other possible embodiments of the invention may be determined according to different projection configurations and the quantity of projection modules, but is not limited to the scope as shown in FIG. 2.

In the present embodiment, the processing module 110 is capable of comparing coordinates or relative position relation of the plurality of first positioning grid points 101 to 104 in the first photographic image with preset coordinates or preset relative position relation of the plurality of first positioning grid points 101 to 104 in the first projection image, so as to, for example, obtain a coordinate transformation equation, and correct a projection result of the projection module 130 in the projection scope 131 by using the coordinate transformation equation. In other words, the projection system 100 of the present embodiment is capable of performing projection correction based on different flatness degrees of different projection surfaces.

In the present embodiment, the part of the first projection image includes the plurality of first positioning grid points 101 to 104, and the area of an overlapped part of the photographing scope 121 and the projection scope 131 is smaller than the projection scope 131. The processing module 110 analyzes the plurality of first positioning grid points 101 to 104 of the first photographic image, so as to obtain a plurality of corresponding first grid point coordinates. Therefore, the processing module 110 is capable of calculating a plurality of preset grid point coordinates corresponding to a plurality of preset positioning grid points G1 in a whole projection scope 131' as shown in FIG. 3 one by one according to the plurality of first grid point coordinates, and the plurality of preset positioning grid points G1 include a plurality of first positioning grid points 101' to 104' as calculation basis. In other words, the quantity of the plurality of first positioning grid points 101' to 104' is smaller than the quantity of the plurality of preset positioning grid points G1. The projection scope 131' and the plurality of preset positioning grid points G1 are basis for the projection module 130 to determine the dimension and proportion of a projection image. That is, the photographing module 120 of the present embodiment is capable of performing projection positioning without capturing the image of the whole projection scope 131. Therefore, the projection system 100 of the present embodiment is also capable of effectively reducing the efficiency requirement of the photographing module 120, so as to save the image computation amount.

Furthermore, since the distance relation among the plurality of first positioning grid points 101 to 104 has different results on difference projection surfaces (may be curved or any non-planar), the processing module 110 of the present embodiment further calculates the positions of other positioning grid points around the plurality of first positioning grid points 101 to 104 according to projection results (distance parameters among the grid points) of the plurality of first positioning grid points 101 to 104 on the projection surface. Therefore, the processing module 110 of the present embodiment is capable of determining a projection result of the projection module 130 in the whole projection scope 131' according to the plurality of preset grid point coordinates of the plurality of preset positioning grid points G1. In other words, the projection system 100 of the present embodiment is capable of performing an effective projection positioning function corresponding to various projection surfaces, for example, projection surfaces with different curvatures.

Figure 4:
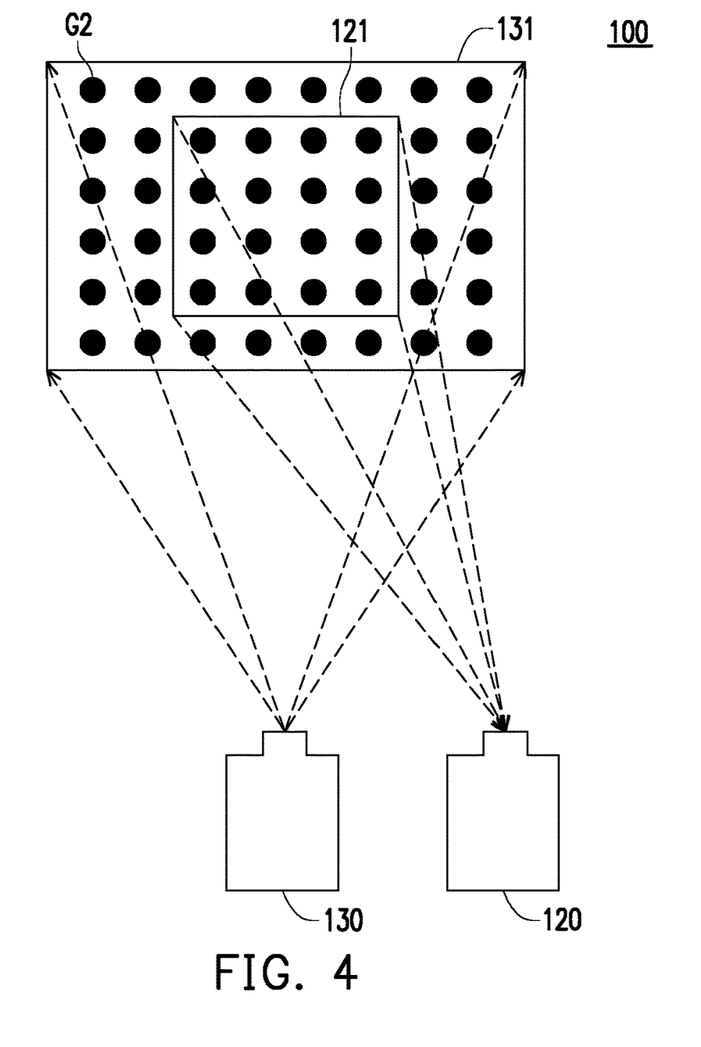
FIG. 4 is a situation schematic diagram of projection of a second projection image according to the embodiment of the FIG. 1.

FIG. 4 is a situation schematic diagram of projection of a second projection image according to the embodiment of the FIG. 1. Referring to FIG. 1, FIG. 3 and FIG. 4, in the situation that the projection surface has non-fixed curvature or the projection surface is any non-planar one, the projection system 100 of the present embodiment is further capable of correcting the plurality of preset grid point coordinates of the plurality of preset positioning grid points G1. Specifically, the projection module 130 may further project a second projection image based on the projection scope 131, and the second projection image includes a plurality of second positioning grid points G2. The photographing module 120 captures a part of the second projection image based on the photographing scope 121, so as to obtain a second photographic image. The second photographic image includes a part of the plurality of second positioning grid points G2. In the present embodiment, the processing module 110 compares a plurality of second grid point coordinates of the part of the plurality of second positioning grid points G2 of the second photographic image with the corresponding part of the plurality of preset grid point coordinates of the plurality of preset positioning grid points G1 in order, so as to determine whether to adjust the plurality of preset grid point coordinates of the plurality of preset positioning grid points G1. The quantity of the plurality of second positioning grid points G2 is greater than the quantity of the plurality of first positioning grid points 101 to 104, and is equal to the quantity of the plurality of preset positioning grid points G1.

In other words, the distance relation among the part of the plurality of second positioning grid points G2, obtained by the photographing module 120 of the present embodiment according to the photographing scope 121 will have different results on different projection surfaces (may be a surface with non-fixed curvature or any non-planar surface), and therefore, the processing module 110 of the present embodiment compares the plurality of second grid point coordinates of the part of the plurality of second positioning grid points G2 of the second photographic image with the corresponding part of the plurality of preset grid point coordinates of the plurality of preset positioning grid points G1 one by one.

In the present embodiment, when the processing module 110 determines that a difference degree between at least one of the plurality of preset positioning grid points G1 and at least one of the plurality of corresponding second positioning grid points G2 is smaller than or equal to a difference threshold, the processing module 110 substitutes at least one of the plurality of corresponding second grid point coordinates with at least one of the plurality of preset grid point coordinates. Correspondingly, when the processing module 110 determines that a difference degree between at least another one of the plurality of preset positioning grid points G1 and at least another one of the plurality of corresponding second positioning grid points G2 is greater than the difference threshold, the processing module 110 maintains at least another one of the plurality of preset grid point coordinates.

In other words, if a slight difference exists between the position of the second positioning grid point G2 projected by the projection module 130, captured by the photographing module 120 and the position of the corresponding preset positioning grid point G1, the processing module 110 determines such difference as normal curvature change of the projection surface. Correspondingly, the processing module 110 corrects the corresponding preset grid point coordinate, so that the processing module 110 may perform corresponding adjustment on adjacent grid points around the preset positioning grid point G1 according to the corrected preset grid points coordinate. Therefore, the projection result changes along with the projection surface. Otherwise, if obvious difference exists between the position of the second positioning grid point projected by the projection module 130, captured by the photographing module 120 and the position of the corresponding preset positioning grid point, the processing module 110 determines such difference as the situation that an obstructing object may exist between the projection surface and the projection module 130, for example, a person or an article. Accordingly, the processing module 110 will not correct the corresponding preset grid point coordinate, so that the projection module 110 is capable of performing projection according to the originally computed preset grid point coordinate. Therefore, the projection result will not change along with the obstructing object.

In one embodiment, the difference degree may depend on at least one of a variation in direction and a variation in distance between each of a corresponding part of the plurality of preset grid point coordinates and each of the plurality of corresponding second grid point coordinates, and the difference threshold may, for example, be an angle threshold or a distance threshold. However, in another embodiment, the difference degree may also depend on at least one of a variation in contrast ratio and a variation in deformation between each of a corresponding part of the plurality of preset positioning grid point G1 and each of the plurality of corresponding second positioning grid points G2, and the difference threshold may, for example, be a variation in contrast ratio threshold or a variation in deformation threshold. In one embodiment, the variation in direction means that the included angle between a direct of a line connected between the adjacent preset positioning grid points G1 and a direct of a line connected between the corresponding adjacent second positioning grid points G2.

Figure 5:
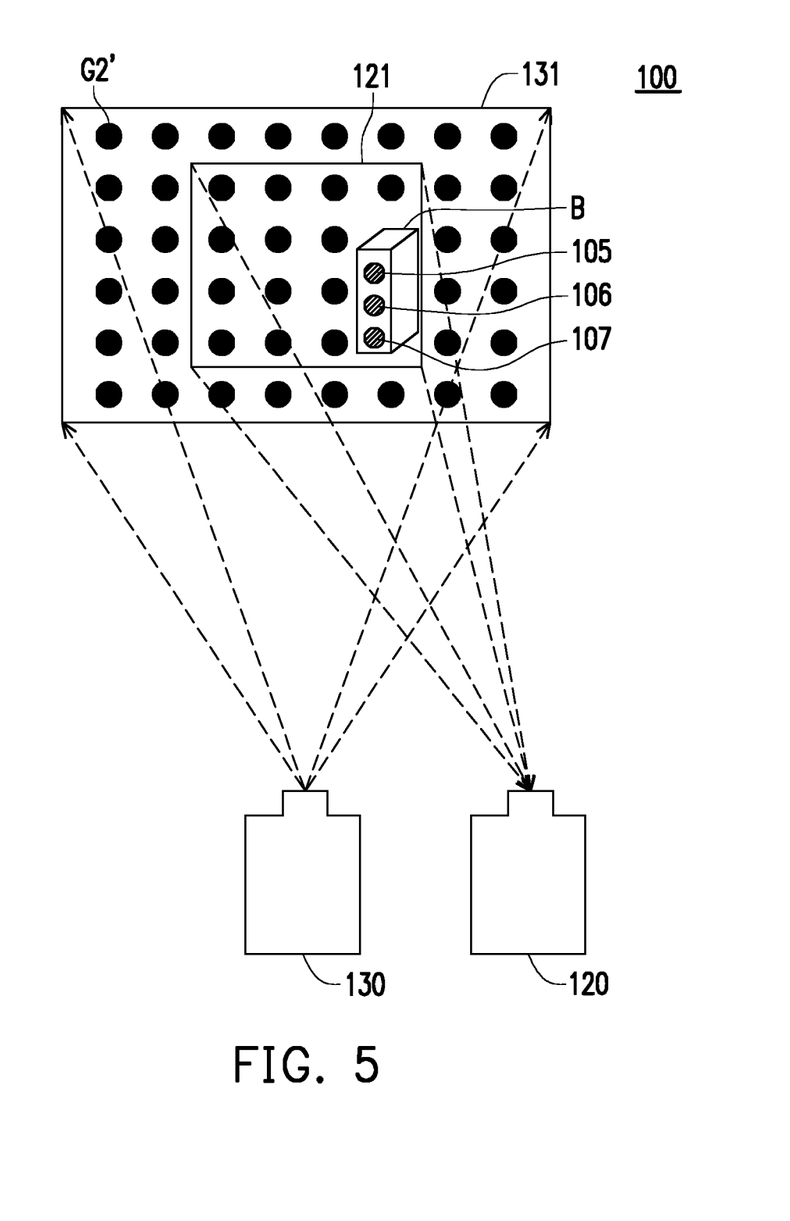
FIG. 5 is another situation schematic diagram of projection of the second projection image according to the embodiment of FIG. 1.

FIG. 5 is another situation schematic diagram of projection of the second projection image according to the embodiment of FIG. 1. Referring to FIG. 1, FIG. 3 and FIG. 5, in the situation that an obstructing object exists between the projection module 130 and the projection surface and affects the projection result of part of the projection image, the projection system 100 of the present embodiment may correspondingly prompt the user. Specifically, the projection module 130 may further project a second projection image based on the projection scope 131, and the second projection image includes a plurality of second positioning grid points G2'. The photographing module 120 captures a part of the second projection image based on the photographing scope 121, so as to obtain a second photographic image. The second photographic image includes a part of the plurality of second positioning grid points G2'. In the present embodiment, the processing module 110 compares the plurality of second grid point coordinates of the part of the plurality of second positioning grid points G2' of the second photographic image with the corresponding part of the plurality of preset grid point coordinates of the plurality of preset positioning grid points G1 in order.

In the present embodiment, when the processing module 110 determines that a difference degree between at least another one of the plurality of preset positioning grid points G1 and at least another one of the plurality of corresponding second positioning grid points G2' is greater than the difference threshold, the processing module 110 maintains at least another one of the plurality of preset grid point coordinates. For example, in the present embodiment, because dramatic displacement or deformation occurs at a plurality of second positioning grid points 105 to 107 due to obstruction of an obstructing object B between the projection module 130 and the projection surface, the projection module 130 is capable of projecting the grid point colors of the plurality of second positioning grid points 105 to 107 to be colors different from those of the other second positioning grid points G2'. That is, the projection system 100 of the present embodiment may effectively provide an automatic prompt function about obstruction of part of the projection image.

Figure 6:
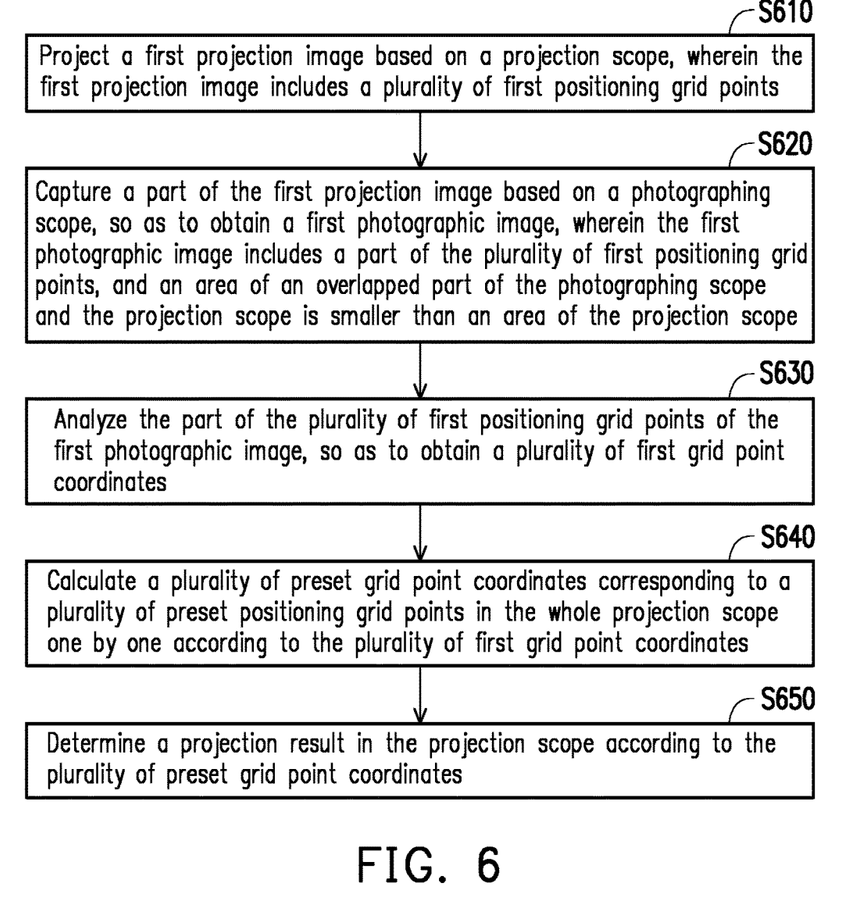
FIG. 6 is a step flow diagram of a projection method according to one embodiment of the present invention.

FIG. 6 is a step flow diagram of a projection method according to one embodiment of the present invention. Referring to FIG. 1 to FIG. 3 and FIG. 6, the projection system 100 may execute the following steps S610 to S650. In step S610, the projection module 130 projects the first projection image based on the projection scope 131, and the first projection image includes a plurality of first positioning grid points 101 to 104. In step S620, the photographing module 120 captures a part of the first projection image based on the photographing scope 121, so as to obtain a first photographic image, wherein the part of the first projection image includes the plurality of first positioning grid points 101 to 104, and the area of an overlapped part of the photographing scope 121 and the projection scope 131 is smaller than the area of the projection scope 131. In step S630, the processing module 110 analyzes the plurality of first positioning grid points 101 to 104 of the first photographic image, so as to obtain a plurality of first grid point coordinates. In step S640, the processing module 110 calculates a plurality of preset grid point coordinates corresponding to a plurality of preset positioning grid points G1 in the whole projection scope 131' one by one according to the plurality of first grid point coordinates. In step S650, the processing module 110 determines a projection result in the projection scope 131' according to the plurality of preset grid point coordinates. Therefore, the projection method of the present embodiment is capable of providing an effective projection positioning function.

In addition, enough teachings, proposals and implementation descriptions may be achieved on the projection system 100 of the present embodiment and other further technological details and implementations according to the descriptions of embodiments of FIG. 1 to FIG. 5, and are not further described herein.

Figure 7:
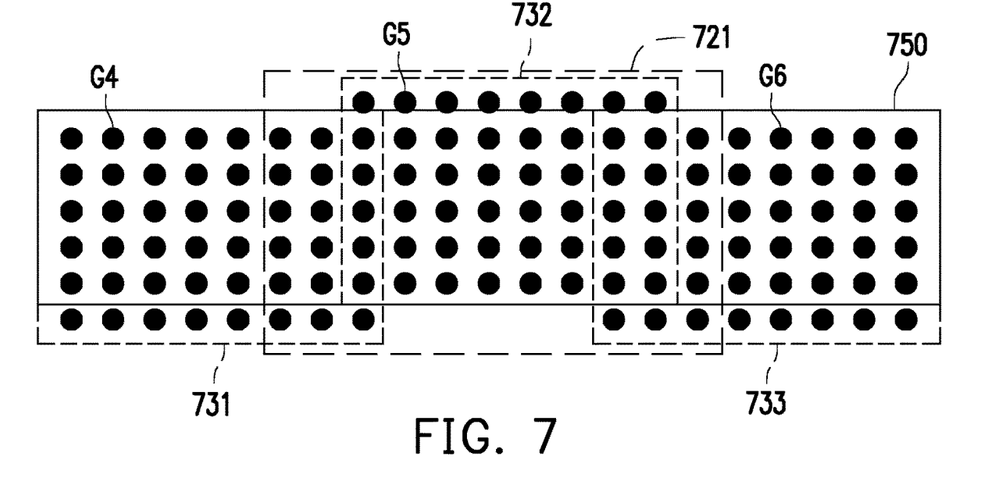
FIG. 7 is a schematic diagram of splicing of a plurality of projection scopes according to one embodiment of the present invention.
Figure 8:
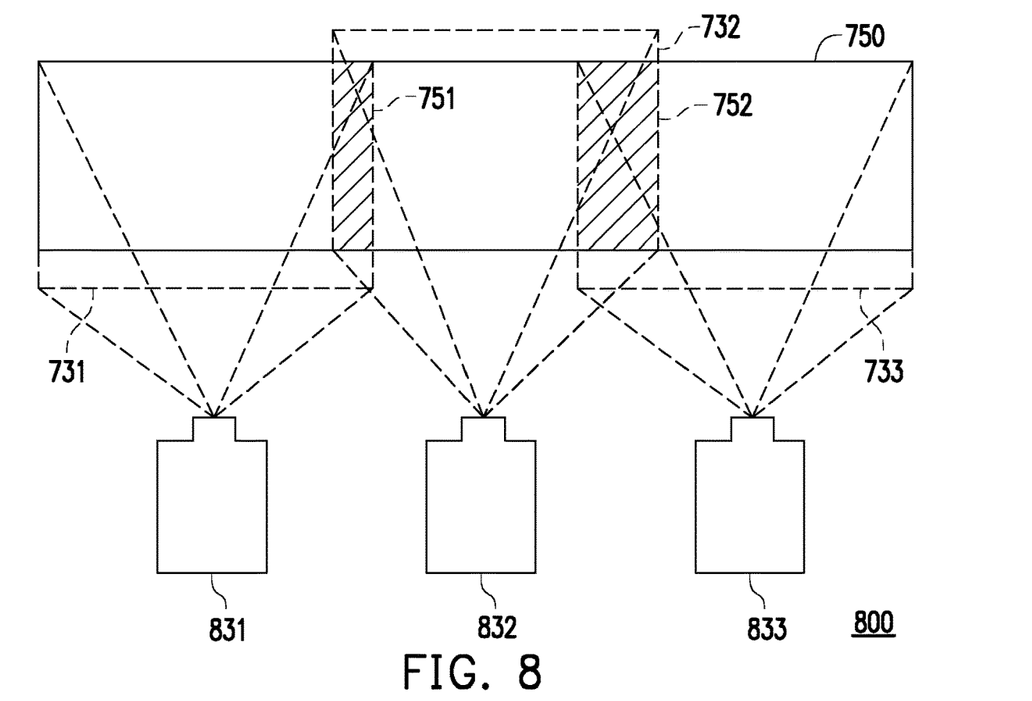
FIG. 8 is a situation schematic diagram of projection performed by the projection system based on the stitching projection scope according to another embodiment of the present invention.

FIG. 7 is a schematic diagram of splicing of a plurality of projection scopes according to one embodiment of the present invention. FIG. 8 is a situation schematic diagram of projection performed by the projection system based on the stitching projection scope according to another embodiment of the present invention. Referring to FIG. 7 and FIG. 8, a projection system 800 is similar to the projection system 100, and the difference is that the projection system 800 may include a first projection module 831, a second projection module 832 and a third projection module 833, and may include one or more photographing modules (not shown in the drawings). The one or more photographing modules may, for example, be at least one provided in the first projection module 831, the second projection module 832 and the third projection module 833, or be provided by being independent from the first projection module 831, the second projection module 832 and the third projection module 833, which is not limited in the present invention.

In the present embodiment, the first projection module 831, the second projection module 832 and the third projection module 833 are capable of executing the projection positioning described in FIG. 1 to FIG. 6 in order so as to obtain a plurality of first preset positioning grid points G4, a plurality of second preset positioning grid points G5 and a plurality of third preset positioning grid points G6 in respective projection scopes 731, 732 and 733 as shown in FIG. 7. It should be noted that the photographing scope 721 of the photographing module of the present embodiment is as shown in FIG. 7, and the area of the photographing scope 721 is smaller than the sum of the areas of the projection scopes 731, 732 and 733. Therefore, the projection system 800 of the present embodiment is capable of effectively reducing the efficiency requirement of the photographing module and saving image computation amount.

In the present embodiment, when the first projection module 831, the second projection module 832 and the third projection module 833 respectively complete the projection positioning, a processing module (not shown in the drawing) of the projection system 800 may perform projection image fusion and splicing according to the plurality of first preset positioning grid points G4, the plurality of second preset positioning grid points G5 and the plurality of third preset positioning grid points G6 respectively corresponding to the first projection module 831, the second projection module 832 and the third projection module 833. For example, the processing module of the projection system 800 may determine and obtain a stitching projection scope 750 according to a plurality of preset grid point coordinates of the plurality of first preset positioning grid points G4, a plurality of preset grid point coordinates of the plurality of second preset positioning grid points G5 and a plurality of preset grid point coordinates of the plurality of third preset positioning grid points G6. The area of the stitching projection scope 750 is smaller than or equal to the sum of the areas of the projection scopes 731, 732 and 733.

In the present embodiment, the stitching projection scope 750 may be a rectangle. Accordingly, the first projection module 831, the second projection module 832 and the third projection module 833 may merge and project a single projection image in the stitching projection scope 750, while the parts, beyond the stitching projection scope 750, of the projection scopes 731, 732 and 733 will not have a projection image or are of preset color, for example, a black screen or a white screen. Furthermore, as shown in FIG. 8, in the overlapped projection area 751 in the stitching projection scope 750, the first projection module 831 and the second projection module 832 may project the same projection image, and in an overlapped projection area 752 in the stitching projection scope 750, the second projection module 832 and the third projection module 833 may project the same projection image. Therefore, the projection system 800 of the present embodiment is capable of effectively performing projection correction and providing a good large-area stitching projection effect.

Figure 9:
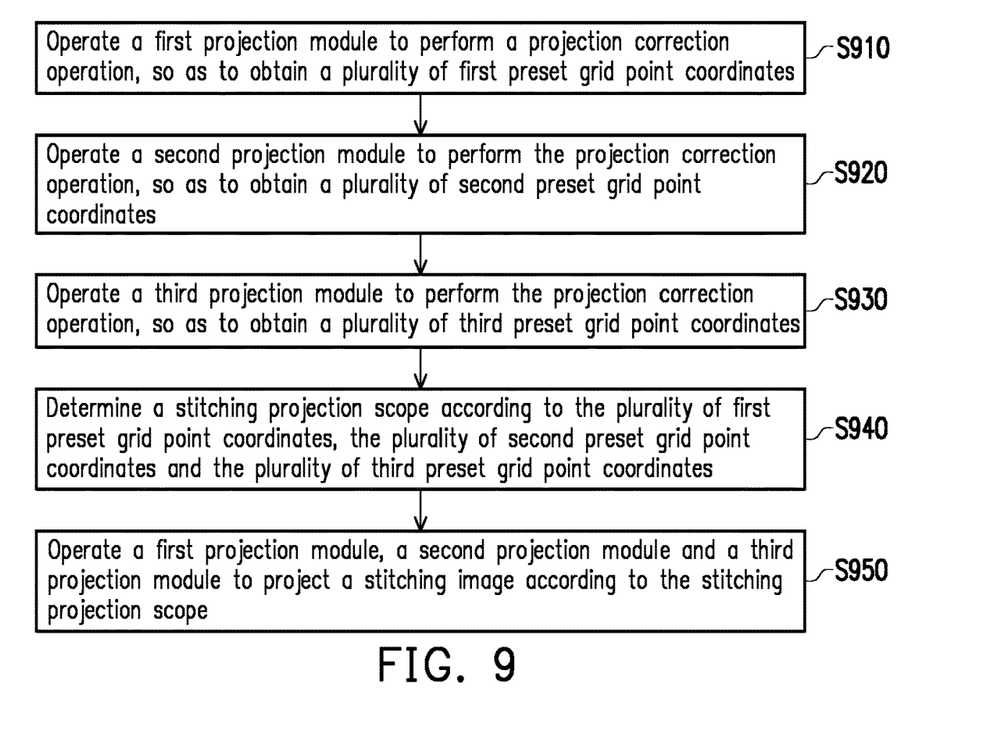
FIG. 9 is a step flow diagram of a projection method according to another embodiment of the present invention.

FIG. 9 is a step flow diagram of the projection method according to another embodiment of the present invention. Referring to FIG. 7 to FIG. 9, the projection system 800 may execute the following steps S910 to S950. In step S910, the projection system 800 may operate the first projection module 831 to perform the projection correction operation, so as to obtain a plurality of first preset grid point coordinates of the plurality of first preset positioning grid points G4. In step S920, the projection system 800 may operate the second projection module 832 to perform the projection correction operation, so as to obtain a plurality of second preset grid point coordinates of the plurality of second preset positioning grid points G5. In step S930, the projection system 800 may operate the third projection module 833 to perform the projection correction operation, so as to obtain a plurality of third preset grid point coordinates of the plurality of third preset positioning grid points G6. In step S940, the projection system 800 determines the stitching projection scope 750 according to the plurality of first preset grid point coordinates, the plurality of second preset grid point coordinates and the plurality of third preset grid point coordinates. In step S950, the projection system 800 operates the first projection module 831, the second projection module 832 and the third projection module 833 to project a stitching image according to the stitching projection scope 750. Therefore, the projection method of the present embodiment is capable of enabling the projection system 800 to effectively perform projection correction, and providing a good large-area stitching projection effect.

In addition, enough teachings, proposals and implementation descriptions may be achieved on the projection system 800 and projection correction of the present embodiment and other further technological details and implementations according to the descriptions of embodiments of FIG. 1 to FIG. 8, and are not further described herein.

To sum up, the embodiments of the present invention at least have one of the following advantages or effects. The projection system and the projection method of the present invention may effectively save the data computation amount needed by projection positioning by means of local image acquisition. Furthermore, the projection system and the projection method of the present invention may operate a plurality of projection modules to respectively execute projection positioning, and then splice and fuse a plurality of positioned and corrected projection scopes into a stitching projection scope with a trim projection boundary. Therefore, the projection system and the projection method of the present invention may provide a large-area projection effect with good projection quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising: a processing module, a projection module and a photographing module, wherein:
   the projection module is coupled to the processing module, and used for projecting a first projection image based on a projection scope, wherein the first projection image includes a plurality of first positioning grid points, and the plurality of the first positioning grid points are arranged within a part of the first projection image; and
   the photographing module is coupled to the processing module, and used for capturing the part of the first projection image based on a photographing scope, so as to obtain a first photographic image, wherein the first projection image projected from the projection module is non-entirely captured by the photographing module, and an area of an overlapped part of the photographing scope and the projection scope is smaller than an area of the projection scope, the processing module analyzes the plurality of first positioning grid points of the first photographic image, so as to obtain a plurality of first grid point coordinates, and the processing module calculates a plurality of calculated grid point coordinates in the projection scope according to the plurality of first grid point coordinates, wherein the processing module determines a projection result of the projection module in the projection scope according to a plurality of preset grid point coordinates, wherein the plurality of preset grid points comprise the plurality of first grid points and the plurality of calculated grid points.

2. The projection system according to claim 1, wherein the quantity of the plurality of first positioning grid points is smaller than the quantity of a plurality of preset positioning grid points corresponding to the plurality of preset grid point coordinates.

3. The projection system according to claim 1, wherein the projection module also projects a second projection image based on the projection scope, and the second projection image includes a plurality of second positioning grid points, the photographing module captures a part of the second projection image based on the photographing scope, so as to obtain a second photographic image, the second photographic image includes a part of the plurality of second positioning grid points, and the processing module compares a plurality of second grid point coordinates of the part of the plurality of second positioning grid points of the second photographic image with the corresponding part of the plurality of preset grid point coordinates in order, so as to determine whether to adjust the plurality of preset grid point coordinates.

4. The projection system according to claim 3, wherein the quantity of the plurality of second positioning grid points is greater than the quantity of the plurality of first positioning grid points, and is equal to the quantity of a plurality of preset positioning grid points corresponding to the plurality of preset grid point coordinates.

5. The projection system according to claim 3, wherein when the processing module determines that a difference degree between at least one of a plurality of preset positioning grid points corresponding to the plurality of preset grid point coordinates and at least one of the plurality of corresponding second positioning grid points is smaller than or equal to a difference threshold, the processing module substitutes at least one of the plurality of corresponding second grid point coordinates with at least one of the plurality of preset grid point coordinates, and when the processing module determines that the difference degree between at least another one of the plurality of preset positioning grid points and at least another one of the plurality of corresponding second positioning grid points is greater than the difference threshold, the processing module maintains the at least another one of the plurality of preset grid point coordinates.

6. The projection system according to claim 5, wherein the difference degree depends on at least one of a variation in direction and a variation in distance between each of a corresponding part of the plurality of preset grid point coordinates and each of the plurality of corresponding second grid point coordinates.

7. The projection system according to claim 5, wherein the difference degree depends on at least one of a variation in contrast ratio and a variation in deformation between each of a corresponding part of the plurality of preset positioning grid points and each of the plurality of corresponding second positioning grid points.

8. The projection system according to claim 5, wherein when the processing module determines that the difference degree between at least another one of the plurality of preset positioning grid points and at least another one of the plurality of corresponding second positioning grid points is greater than the difference threshold, the projection module projects a grid point color of at least another one of the plurality of second positioning grid points to be different from that of other second positioning grid points.

9. The projection system according to claim 1, further comprising:

another projection module, which is coupled to the processing module, and used for projecting another first projection image based on another projection scope, wherein the another first projection image includes a plurality of other first positioning grid points, the photographing module captures a part of the another first projection image based on the photographing scope, so as to obtain another first photographic image, the part of the another first projection image includes the plurality of other first positioning grid points, and an area of the photographing scope is smaller than the sum of areas of the projection scope and the another projection scope, and the processing module analyzes the other first positioning grid points of the another first photographic image, so as to obtain a plurality of other first grid point coordinates, and the processing module calculates a plurality of other calculated grid point coordinates around the plurality of other first grid point coordinates in the whole another projection scope according to the plurality of other first grid point coordinates, wherein the processing module determines a projection result of the another projection module in the another projection scope according to a plurality of other preset grid point coordinates, wherein the plurality of other preset grid point coordinates comprise the plurality of other first grid point coordinates and the plurality of other calculated grid point coordinates.

10. The projection system according to claim 9, wherein the processing module determines a stitching projection scope of the projection module and the another projection module according to the plurality of preset grid point coordinates and the plurality of other preset grid point coordinates, and an area of the stitching projection scope is smaller than or equal to the sum of the areas of the projection scope and the another projection scope.

11. A projection method, comprising:

projecting, by a projection module, a first projection image based on a projection scope, wherein the first projection image includes a plurality of first positioning grid points, and the plurality of the first positioning grid points are arranged within a part of the first projection image;

capturing the part of the first projection image, by a photographing module, based on a photographing scope, so as to obtain a first photographic image, wherein the first projection image projected from the projection module is non-entirely captured by the photographing module, and an area of an overlapped part of the photographing scope and the projection scope is smaller than an area of the projection scope;

analyzing the plurality of first positioning grid points of the first photographic image, so as to obtain a plurality of first grid point coordinates;

calculating a plurality of calculated grid point coordinates in the projection scope according to the plurality of first grid point coordinates; and determining a projection result in the projection scope according to a plurality of preset grid point coordinates, wherein the plurality of preset grid point coordinates comprise the plurality of first grid point coordinates and the plurality of calculated grid point coordinates.

12. The projection method according to claim 11, wherein the quantity of the plurality of first positioning grid points is smaller than the quantity of a plurality of preset positioning grid points corresponding to the plurality of preset grid point coordinates.

13. The projection method according to claim 11, further comprising:

projecting a second projection image based on the projection scope, wherein the second projection image includes a plurality of second positioning grid points, capturing a part of the second projection image based on the photographing scope, so as to obtain a second photographic image, wherein the second photographic image includes a part of the plurality of second positioning grid points, and comparing a plurality of second grid point coordinates of the part of the plurality of second positioning grid points of the second photographic image with the corresponding part of the plurality of preset grid point coordinates in order, so as to determine whether to adjust the plurality of preset grid point coordinates.

14. The projection method according to claim 13, wherein the quantity of the plurality of second positioning grid points is greater than the quantity of the plurality of first positioning grid points, and is equal to the quantity of a plurality of preset positioning grid points corresponding to the plurality of preset grid point coordinates.

15. The projection method according to claim 13, further comprising:

when the processing module determines that a difference degree between at least one of a plurality of preset positioning grid points corresponding to the plurality of preset grid point coordinates and at least one of the plurality of corresponding second positioning grid points is smaller than or equal to a difference threshold, substituting at least one of the plurality of corresponding second grid point coordinates with at least one of the plurality of preset grid point coordinates; and when the processing module determines that the difference degree between at least another one of the plurality of preset positioning grid points and at least another one of the plurality of corresponding second positioning grid points is greater than the difference threshold, maintaining at least another one of the plurality of preset grid point coordinates.

16. The projection method according to claim 15, wherein the difference degree depends on at least one of a variation in direction and a variation in distance between each of a corresponding part of the plurality of preset grid point coordinates and each of the plurality of corresponding second grid point coordinates.

17. The projection method according to claim 15, wherein the difference degree depends on at least one of a variation in contrast ratio and a variation in deformation between each of a corresponding part of the plurality of preset positioning grid point and each of the plurality of corresponding second positioning grid points.

18. The projection method according to claim 15, further comprising:

when determining that the difference degree between at least another one of the plurality of preset positioning grid points and at least another one of the plurality of corresponding second positioning grid points is greater than the difference threshold, projecting a grid point color of at least another one of the plurality of second positioning grid points to be different from that of other second positioning grid points.

19. The projection method according to claim 11, further comprising projecting another first projection image based on another projection scope, wherein the another first projection image includes a plurality of other first positioning grid points;

capturing a part of the another first projection image based on the photographing scope, so as to obtain another first photographic image, wherein the part of the another first projection image includes the plurality of other first positioning grid points, and an area of the photographing scope is smaller than the sum of areas of the projection scope and the another projection scope;

analyzing the plurality of other first positioning grid points of the another first photographic image, so as to obtain a plurality of other first grid point coordinates;

calculating a plurality of other calculated grid point coordinates around the plurality of other first grid point coordinates in another projection scope according to the plurality of other first grid point coordinates; and determining a projection result of the another projection module in the another projection scope according to a plurality of other preset grid point coordinates, wherein the plurality of other preset grid point coordinates comprise the plurality of other first grid point coordinates and the plurality of other calculated grid point coordinates.

20. The projection method according to claim 19, further comprising:

determining a stitching projection scope of the projection module and the another projection module according to the plurality of preset grid point coordinates and the plurality of other preset grid point coordinates, wherein an area of the stitching projection scope is smaller than or equal to the sum of the areas of the projection scope and the another projection scope.

21. A projection system, comprising: a processing module, a projection module and a photographing module, wherein:

the projection module is coupled to the processing module, and used for projecting a first projection image based on a projection scope, wherein the first projection image includes a plurality of first positioning grid points; and the photographing module is coupled to the processing module, and used for capturing a part of the first projection image based on a photographing scope, so as to obtain a first photographic image, wherein the part of the first projection image includes the plurality of first positioning grid points, and an area of an overlapped part of the photographing scope and the projection scope is smaller than an area of the projection scope, the processing module analyzes the plurality of first positioning grid points of the first photographic image, so as to obtain coordinates of a plurality of first grid points, and the processing module calculates coordinates of a plurality of calculated grid points in the projection scope according to coordinates of the plurality of first grid points, wherein the processing module determines a projection result of the projection module in the projection scope according to coordinates of a plurality of preset grid points, wherein the plurality of preset grid points comprise the plurality of first grid points and the plurality of calculated grid points, wherein the projection module projects a second projection image based on the projection scope, and the second projection image includes a plurality of second positioning grid points, the photographing module captures a part of the second projection image based on the photographing scope, so as to obtain a second photographic image, the second photographic image includes a part of the plurality of second positioning grid points, and the processing module compares coordinates of the part of the plurality of second positioning grid points of the second photographic image with coordinates of the corresponding part of the plurality of preset grid points in order, so as to determine whether to adjust coordinates of the plurality of preset grid points.

22. A projection system, comprising: a processing module, a projection module and a photographing module, wherein:

the projection module is coupled to the processing module, and used for projecting a first projection image based on a projection scope, wherein the first projection image includes a plurality of first positioning grid points; and the photographing module is coupled to the processing module, and used for capturing a part of the first projection image based on a photographing scope, so as to obtain a first photographic image, wherein the part of the first projection image includes the plurality of first positioning grid points, and an area of an overlapped part of the photographing scope and the projection scope is smaller than an area of the projection scope, the processing module analyzes the plurality of first positioning grid points of the first photographic image, so as to obtain coordinates of a plurality of first grid points, and the processing module calculates coordinates of a plurality of calculated grid points in the projection scope according to the coordinates of the plurality of first grid points, wherein the processing module determines a projection result of the projection module in the projection scope according to coordinates of a plurality of preset grid points, wherein the plurality of preset grid points comprise the plurality of first grid points and the plurality of calculated grid points, wherein the projection system further comprises:

another projection module, which is coupled to the processing module, and used for projecting another first projection image based on another projection scope, wherein the another first projection image includes a plurality of other first positioning grid points, the photographing module captures a part of the another first projection image based on the photographing scope, so as to obtain another first photographic image, the part of the another first projection image includes the plurality of other first positioning grid points, and an area of the photographing scope is smaller than the sum of areas of the projection scope and the another projection scope, and the processing module analyzes the other first positioning grid points of the another first photographic image, so as to obtain coordinates of a plurality of other first grid points, and the processing module calculates coordinates of a plurality of other calculated grid points in another projection scope according to coordinates of the plurality of other first grid points, wherein the processing module determines a projection result of the another projection module in the another projection scope according to coordinates of a plurality of other preset grid points wherein the plurality of other preset grid points comprise the plurality of other first grid point coordinates and the plurality of other calculated grid points.

23. A projection method, comprising:

projecting a first projection image based on a projection scope, wherein the first projection image includes a plurality of first positioning grid points;

capturing a part of the first projection image based on a photographing scope, so as to obtain a first photographic image, wherein the part of the first projection image includes the plurality of first positioning grid points, and an area of an overlapped part of the photographing scope and the projection scope is smaller than an area of the projection scope;

analyzing the plurality of first positioning grid points of the first photographic image, so as to obtain coordinates of a plurality of first grid points;

calculating coordinates of a plurality of calculated grid points in the projection scope according to coordinates of the plurality of first grid points; and determining a projection result in the projection scope according to coordinates of a plurality of preset grid points, wherein the plurality of preset grid points comprise the plurality of first grid points and the plurality of calculated grid points, wherein the projection method further comprises:

projecting a second projection image based on the projection scope, wherein the second projection image includes a plurality of second positioning grid points, capturing a part of the second projection image based on the photographing scope, so as to obtain a second photographic image, wherein the second photographic image includes a part of the plurality of second positioning grid points, and comparing the coordinates of the part of the plurality of second positioning grid points of the second photographic image with the coordinates of the corresponding part of the plurality of preset grid points in order, so as to determine whether to adjust the coordinates of the plurality of preset grid points.

24. A projection method, comprising:

projecting a first projection image based on a projection scope, wherein the first projection image includes a plurality of first positioning grid points;

capturing a part of the first projection image based on a photographing scope, so as to obtain a first photographic image, wherein the part of the first projection image includes the plurality of first positioning grid points, and an area of an overlapped part of the photographing scope and the projection scope is smaller than an area of the projection scope;

analyzing the plurality of first positioning grid points of the first photographic image, so as to obtain coordinates of a plurality of first grid points;
calculating coordinates of a plurality of calculated grid points in the projection scope according to coordinates of the plurality of first grid points; and
determining a projection result in the projection scope according to coordinates of a plurality of preset grid points, wherein the plurality of preset grid points comprise the plurality of first grid points and the plurality of calculated grid points,
wherein the projection method further comprises:
  projecting another first projection image based on another projection scope, wherein the another first projection image includes a plurality of other first positioning grid points;
  capturing a part of the another first projection image based on the photographing scope, so as to obtain another first photographic image, wherein the part of the another first projection image includes the plurality of other first positioning grid points, and an area of the photographing scope is smaller than the sum of areas of the projection scope and the another projection scope;
  analyzing the plurality of other first positioning grid points of the another first photographic image, so as to obtain coordinates of a plurality of other first grid points;
  calculating coordinates of a plurality of other calculated grid points in the another projection scope according to coordinates of the plurality of other first grid points; and
  determining a projection result of the another projection module in the another projection scope according to coordinates of a plurality of other preset grid points, wherein the plurality of other preset grid points comprise the plurality of other first grid points and the plurality of other calculated grid points.

* * * * *